United States Patent
Kern et al.

[11] Patent Number: 5,871,286
[45] Date of Patent: Feb. 16, 1999

[54] MOLDED WHEEL AND BEARING ASSEMBLY

[75] Inventors: Alan R. Kern; Scottlan R. Henry; Christopher M. Johnson, all of Richmond, Va.

[73] Assignee: Rehrig International, Inc., Richmond, Va.

[21] Appl. No.: 827,371

[22] Filed: Mar. 27, 1997

[51] Int. Cl.[6] ................................................ B60B 27/06
[52] U.S. Cl. ........................ 384/280; 384/295; 384/416; 301/105.1
[58] Field of Search .................... 301/5.1, 64.7, 301/105.1; 384/280, 295, 416, 537, 276

[56] References Cited

U.S. PATENT DOCUMENTS

| | | |
|---|---|---|
| 453,215 | 6/1891 | Severin . |
| 528,278 | 10/1894 | Roberts et al. . |
| 619,225 | 2/1899 | Reece . |
| 729,656 | 6/1903 | Penprase . |
| 1,471,134 | 10/1923 | Ash . |
| 1,892,845 | 1/1933 | McGrath . |
| 2,797,605 | 7/1957 | Metze, Jr. et al. . |
| 3,091,795 | 6/1963 | Budwig . |
| 3,283,358 | 11/1966 | Merriam . |
| 3,400,988 | 9/1968 | Hudson et al. . |
| 3,438,686 | 4/1969 | Stone . |
| 3,449,032 | 6/1969 | Scheufler ........................ 384/280 X |
| 4,058,344 | 11/1977 | Dyson . |
| 4,122,580 | 10/1978 | Black . |
| 4,262,928 | 4/1981 | Leitzel . |
| 4,321,727 | 3/1982 | Sheiman et al. . |
| 4,428,689 | 1/1984 | Choate . |
| 4,559,669 | 12/1985 | Bonzer et al. . |
| 4,592,595 | 6/1986 | Freeman . |
| 4,622,731 | 11/1986 | Kjell . |
| 4,883,319 | 11/1989 | Scott . |
| 5,174,633 | 12/1992 | Kidd et al. . |
| 5,211,489 | 5/1993 | Moore ................................ 384/537 X |
| 5,275,472 | 1/1994 | Hicks . |
| 5,275,473 | 1/1994 | Hicks . |
| 5,577,843 | 11/1996 | Leininger et al. . |
| 5,690,395 | 11/1997 | Hicks .................................. 301/105.1 |

FOREIGN PATENT DOCUMENTS

| | | | |
|---|---|---|---|
| 1332603 | 10/1973 | United Kingdom ................... | 384/280 |

*Primary Examiner*—Russell D. Stormer
*Attorney, Agent, or Firm*—Bacon & Thomas, PLLC

[57] ABSTRACT

A molded bearing assembly for a molded wheel includes a synthetic resin outer bearing race element embedded in the hub of the molded wheel and having a cylindrical inner sliding, journal type bearing surface. An inner bearing assembly includes two molded synthetic resin bearing halves having continuous cylindrical outer bearing surfaces disposed within the outer bearing race in sliding engagement with the inner bearing surface of the outer race. The bearing halves of the inner bearing assembly abut each other at their inner ends and may include interlocking structural features at their inner ends that enable securing of the bearing halves together at their inner ends while presenting a continuous outer cylindrical bearing sliding surface that cooperates with the adjacent surface of the outer race. A wheel axle extends through the inner bearing assembly and supports the wheel and bearing assembly for rotation relative to a wheel support. The molded wheel and bearing assembly is adapted for use with a shopping cart.

27 Claims, 4 Drawing Sheets

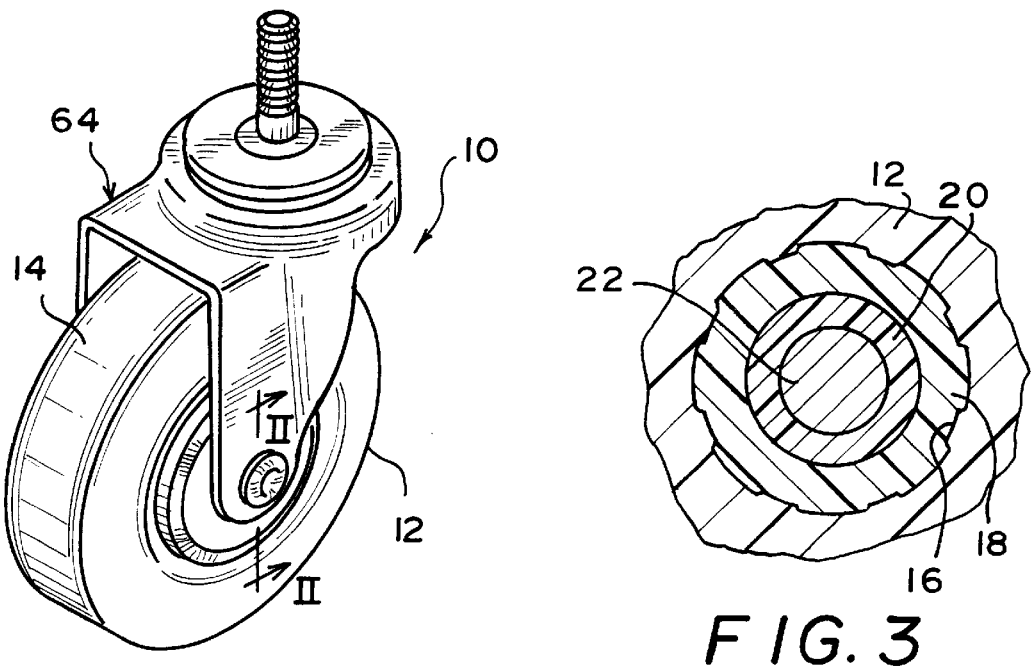
FIG. 1
FIG. 3
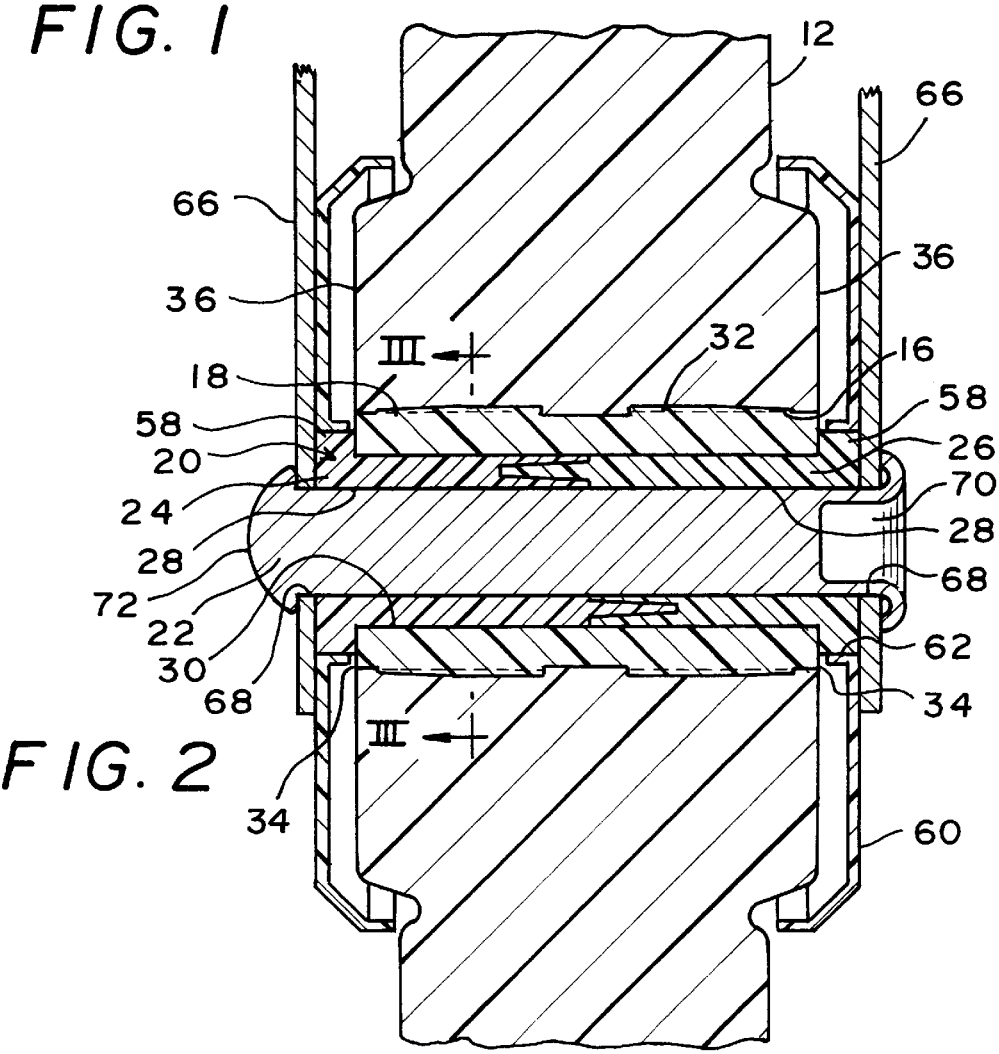
FIG. 2

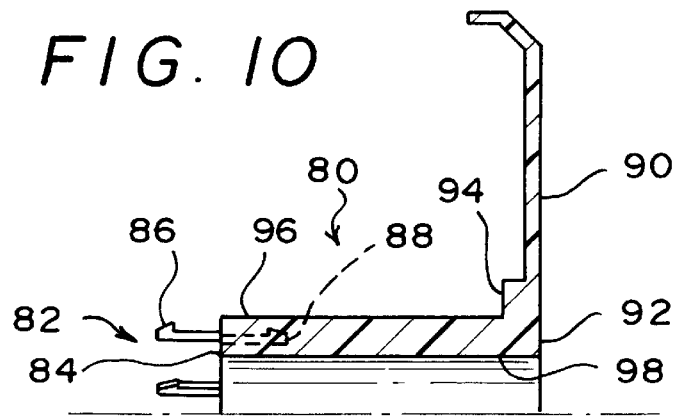
FIG. 10
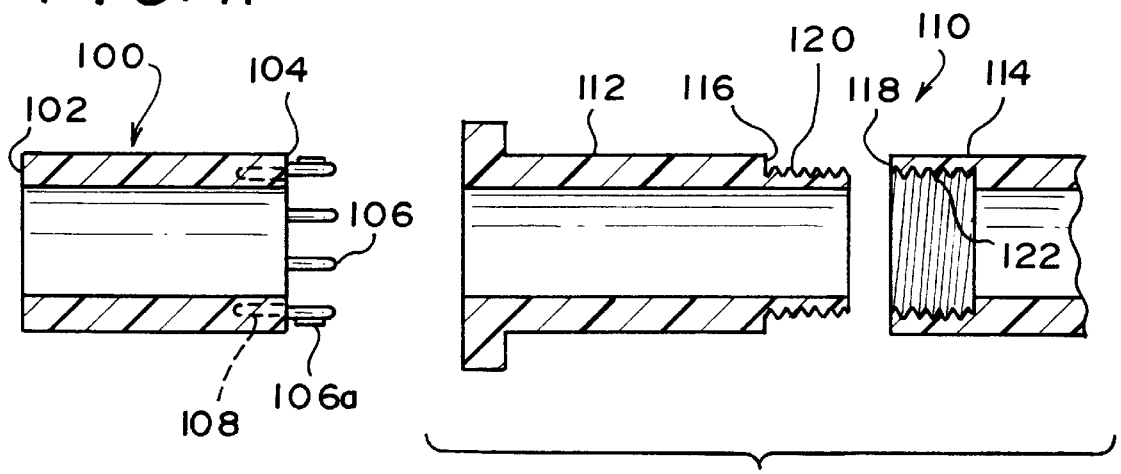
FIG. 11
FIG. 12
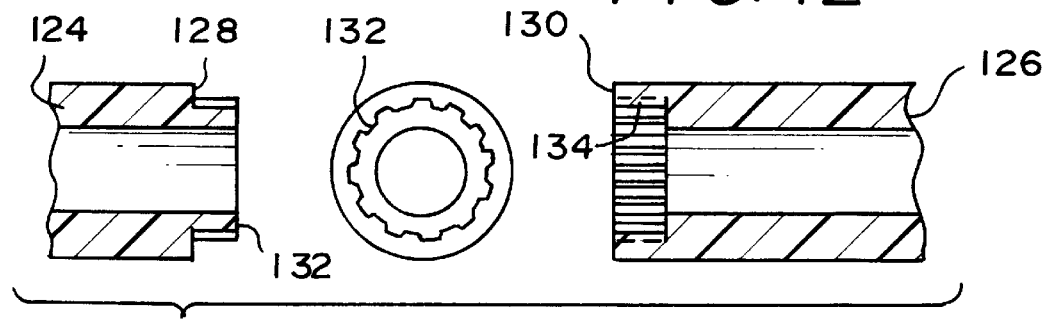
FIG. 13
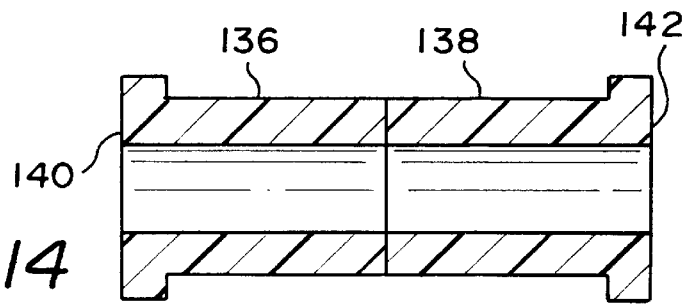
FIG. 14

5,871,286

MOLDED WHEEL AND BEARING ASSEMBLY

BACKGROUND OF THE INVENTION

1. Field of the Invention

A molded resin or rubber wheel and molded resin bearing assembly especially adapted for shopping cart usage.

2. Discussion of Related Art

Wheel assemblies for shopping carts are expected to be inexpensive to manufacture, simple to assemble and capable of withstanding exposure to weather extremes, abuse and high loads, while at the same time enabling quiet, smooth and low rolling friction movement of carts. Molded, high strength rubber and polymer resin compounds have been used extensively for the wheels of such carts and more recently the use of molded bearing components in the hubs of such wheels has been suggested to absorb shock loads, avoid corrosion problems and to lower the cost of the wheel and bearing assemblies.

Examples of prior art molded wheels having resin or non-metal bearing components are seen in U.S. Pat. Nos. 4,592,595 and 5,174,633. These examples, however, include metal components and are somewhat complex to manufacture and assemble.

BRIEF SUMMARY OF THE INVENTION

The invention disclosed and claimed herein is an assembly of a molded resin or rubber wheel with a molded synthetic resin bearing in the wheel hub that provides a high strength, durable wheel that is particularly well-suited for shopping cart applications.

The sliding bearing surfaces that enable low friction rotation of a wheel associated with the bearing are formed as part of the bearing elements and the entire wheel assembly can be manufactured and assembled in a cost effective manner.

The molded wheel and bearing assembly includes a wheel formed of durable moldable synthetic resin or rubber with a central hub that receives a structural supporting axle element. Between the axle element and the wheel hub there is provided a cylindrical outer bearing race and an inner bearing assembly that include inner sliding sliding bearing surfaces so that the outer bearing race can smoothly rotate over an outer bearing surface provided by the inner bearing assembly which normally does not rotate. Both the outer bearing race and the inner bearing assembly are formed of moldable synthetic resin that inherently provides low friction sliding bearing surfaces.

The outer bearing race is embedded within the wheel hub and includes suitable projections that effectively lock the outer bearing race against movement within the hub.

The inner bearing assembly is made in two halves that extend axially through the outer race with the inner ends of the halves adjacent each other within the outer race. The outer ends of the inner bearing assembly are located adjacent the outer ends of the outer bearing race and may be enlarged to provide end bearing surfaces and spacers that cooperate with supporting flanges of a caster or other wheel supporting element connecting the wheel and its axle to a cart structure.

A central axle element typically formed of metal extends through the inner bearing assembly and secures the entire wheel and bearing assembly to a wheel support structure associated with a cart.

The halves of the inner bearing assembly may include interlocking structural features at their inner ends that cooperate with each other when the ends are butted against each other to prevent relative rotation between the inner bearing halves while supporting the inner ends of the bearing halves against radial displacement and, in some embodiments, relative axial and rotational displacement. Both halves of the inner bearing assembly are configured so as to provide a continuous outer cylindrical bearing sliding surface that cooperates with an inner sliding bearing surface of the outer bearing race.

When the wheel and bearing components are assembled, the inner bearing assembly extends coaxially with the wheel supporting axle and coaxially with the outer bearing race within the molded wheel hub. The wheel support structure is secured to the axle in a manner that locks the axle and the inner bearing assembly together against relative rotational movement so that the wheel and the associated outer bearing race rotate relative to the inner bearing assembly and the axle at the cylindrical bearing sliding surfaces in the manner of a continuous journal bearing.

BRIEF DESCRIPTION OF THE DRAWINGS

FIG. 1 shows an isometric view of a wheel assembly including a molded wheel and bearing assembly attached to a caster;

FIG. 2 is a partial cross-section elevational view taken along line II—II in FIG. 1;

FIG. 3 is a cross-sectional view taken along line III—III in FIG. 2;

FIGS. 10–14 show other embodiments of the inner bearing halves of the inner bearing assembly.

DESCRIPTION OF PREFERRED EMBODIMENTS OF THE INVENTION

Figure 4:
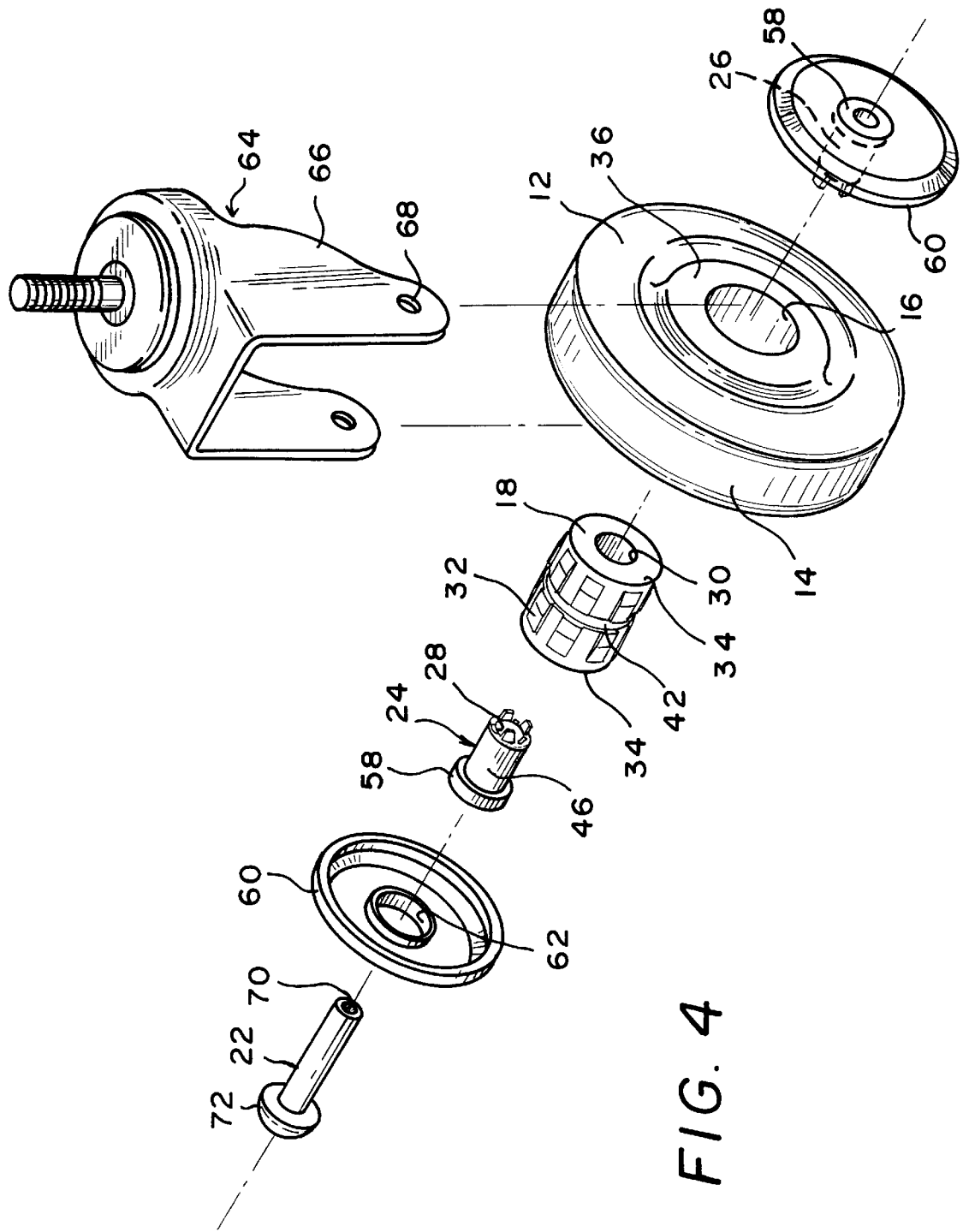
FIG. 4 is an exploded view of the wheel assembly illustrated in FIG. 1 showing the molded outer bearing race and the molded inner bearing assembly in accordance with the invention.

With reference to FIGS. 1 and 2 of the appended drawings, 10 denotes a wheel assembly constructed in accordance with a preferred embodiment of the invention, wherein the assembly includes a molded wheel 12, preferably formed from a durable, moldable, wear resistant rubber or synthetic resin compound. The wheel is annular in shape, and includes an outer rolling surface 14 and an axial bore 16 (see FIG. 2) intended to receive an outer bearing race 18, an inner bearing assembly 20 and an axle 22. The inner bearing assembly 20 includes inner bearing halves 24,26 that each includes an axially extending inner bore 28 that receives a metal axle 22 therein. The wheel 12 is illustrated in combination with a caster 64 to be described below.

The inner bearing assembly 20 is disposed in close fitting relationship in an inner axial bore of the outer bearing race 18, as shown in FIGS. 2 and 3. The intersection between the outer peripheral surfaces of the inner bearing assembly and the axial bore of the outer race constitute sliding bearing surfaces that are intended to accommodate relative motion with low friction between the surfaces in the manner of an unlubricated journal bearing. The sliding bearing surfaces will be described in more detail in the following description of the invention.

Figure 5:
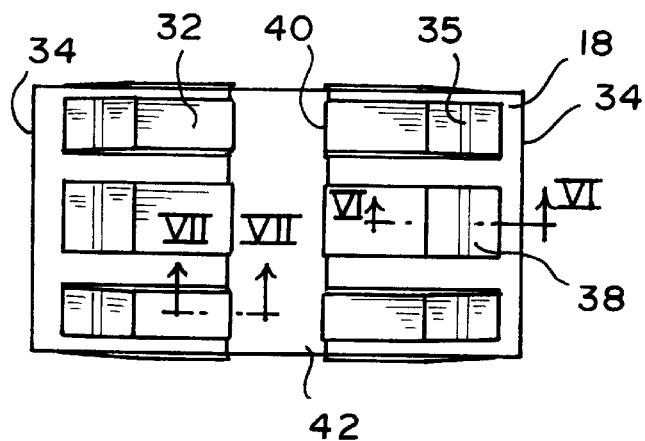
FIG. 5 is a plan view of the outer bearing race.

The outer bearing race 18 is formed of moldable synthetic resin and includes a central cylindrical bore 30 that defines a continuous inner bearing sliding surface or bearing race along its entire length. As shown in FIGS. 4 and 5, the outer bearing race 18 includes circumferentially spaced, radially and axially extending projections 32 on its outer peripheral surface.

The outer bearing race 18 is assembled into the bore 16 of wheel 12, preferably while the wheel 12 is still hot from a molding operation used to form the wheel to thereby cause the projections 32 to be forcibly imbedded into the resin of the wheel material to thereby lock the outer race 18 permanently into the bore 16 of the wheel 12. As seen in FIG. 2, the outer bearing race 18 includes outer ends 34 that preferably lie flush with the radial faces 36 of the inner hub area of wheel 12. As shown in FIG. 2, the inner hub area of wheel 12 including the outer radial faces 36 is preferably axially enlarged compared with the remainder of the body of wheel 12.

Figure 6:
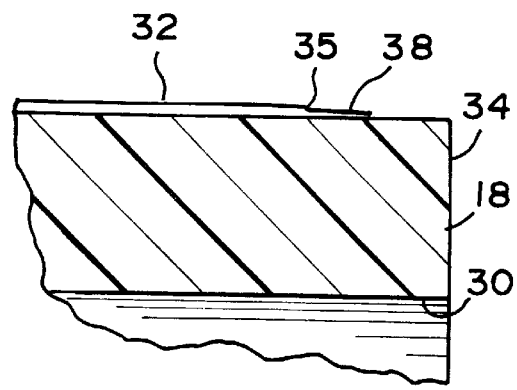
FIG. 6 is a partial sectional view taken along line VI—VI in FIG. 5.

The outer projections 32 preferably include outer end portions 38 that are tapered radially inwardly toward the bore 16 as the projections 32 approach the ends 34 of the outer bearing race 18 (see FIG. 6). A stepped taper with a steeper ridge 35 is preferred because it tends to retain the bearing race 18 in the wheel 12 in a superior manner.

Figure 7:
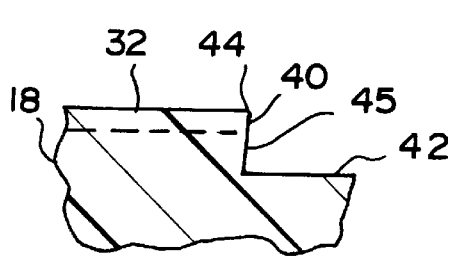
FIG. 7 is a partial sectional view taken along line VII—VII in FIG. 5.

The inner end portions 40 of projections 32 each terminate at a circumferentially extending channel 42 located centrally along the outer surface of the outer race 18. The channel 42 is defined by a peripheral undercut around the peripheral surface of the outer bearing race 18 as shown in FIGS. 5 and 7. The outer bearing race 18 is formed so that a sharp edge 44 is provided at the inner ends 40 of projections 42, as shown in FIG. 7, and the end portions 40 and side wall 45 of the channel 42 may be sloped inwardly and axially toward the respective outer ends of the outer bearing race to enhance the sharp corner 44 as shown in FIG. 7.

As shown in FIG. 2, when the outer bearing race 18 is fully assembled in the wheel 12, the outer projections 32 are firmly imbedded in the wheel material along the bore 16, with the sharp edges 44 in cooperation with the channel 42, and the ridges 35, forming a positive lock against relative axial and rotational movement between the outer bearing race 18 and the bore 16 of the wheel 12. The tapered end portions 38 of projections 32 facilitate insertion of the outer bearing race 18 into the bore 16 during assembly of the outer bearing race 18 and wheel 12.

While it is preferred to assembly outer bearing race 18 into the bore 16 of wheel 12 while the wheel 12 is still hot and relatively soft from a molding process used to form the wheel, other processes can be used to insert the outer bearing race 16 into the bore 16 so as to result in an intimate engagement between the outer periphery of the inner bearing race 18 and the inner periphery of the bore 16 of wheel 12. For example, the wheel can be heated after molding to soften the material forming the wheel in the area of the bore or other procedures may be used so as to secure an intimate interlocking interconnection between the outer bearing race 18 and the bore 16.

While outwardly projecting protrusions 32 are illustrated in the preferred embodiment, it is to be understood that other structural details could be utilized to cause an interlocking relationship between the outer periphery of the outer bearing race 18 and the bore 16 of wheel 12. For example, different forms of outer projections could be used as well as different forms of undercuts, slots and grooves in the periphery of the outer bearing race 18.

Figure 8:
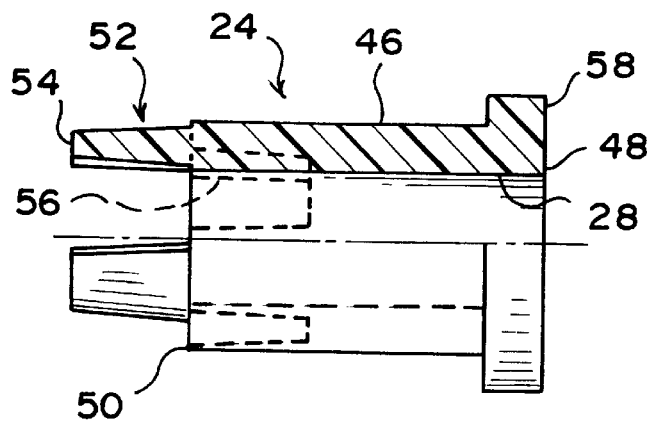
FIG. 8 illustrates one embodiment of an inner bearing half of the inner bearing assembly.
Figure 9:
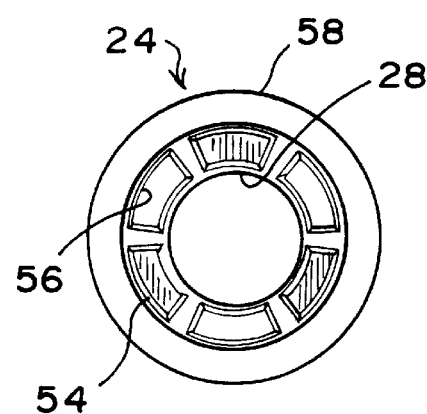
FIG. 9 is an end view of the bearing half of FIG. 8 as viewed from the left in FIG. 8.

The inner bearing assembly 20, as noted previously, includes inner bearing halves 24,26 that each include an outer bearing sliding surface 46 and an inner, axle receiving bore 28, as shown in FIG. 8. In the embodiment of FIGS. 2 and 8, each bearing half 24,26 is identical and the two bearing halves present a continuous outer cylindrical sliding bearing surface 46 when the halves are assembled with their inner ends abutting each other as illustrated in FIG. 2. However, the designation "bearing half" also includes two bearing portions that may not precisely correspond to one-half of the inner bearing assembly 20. For example, one of the bearing portions may be somewhat longer than the other bearing portion, although when the two portions are assembled with their inner ends abutting each other, they present a continuous outer cylindrical sliding bearing surface 46. Accordingly, for convenience the bearing portions 24,26 will be referred to herein as "bearing halves".

In the embodiment illustrated in FIG. 8, each bearing half 24 includes an outer end 48, an inner end 50 and an interlocking structure 52 on its inner end that includes axially extending male fingers 54 and axially extending female sockets 56. The fingers 54 and sockets 56 are configured to mate in close fitting relationship with each other when the inner ends 50 of two bearing halves 24,26 are disposed with their inner ends abutting each other, as illustrated in FIG. 2.

The outer ends 48 of the bearing halves 24,26, in the embodiment illustrated in FIG. 2, include enlarged portions 58 having a greater radially dimension than the outer cylindrical bearing surfaces 46 of the bearing 24,26.

In accordance with the embodiment illustrated in FIG. 2, a dust shield 60 having a central aperture 68 is mounted on the enlarged portion 58 of the outer ends 48 of bearing halves 24,26 with the central aperture 68 of the dust shield 60 in close fitting relationship with the enlarged portion 58 of the bearing halves 24,26.

It will be noted that the interlocking structure 52 prevents relative rotation between the bearing halves 24,26 and provides a rigid interconnection between the inner ends 50 of the bearing halves 24,26 when they are assembled with their inner ends abutting each other, as shown in FIG. 2. In addition, it will be noted that a continuous outer bearing sliding surface 46 is presented when the bearing halves 24,26 are assembled with their ends 50 abutting each other and with the interlocking structure 52 engaged. It will also be noted that the interlocking structure 52 prevents relative radial movement between the inner ends 50 of the bearing halves 24,26 when the interlocking structure is engaged. The engagement between the fingers 52 and sockets 56 results in the fingers and sockets being interdigited when the inner ends 50 of the inner bearing halves 24,26 are abutted against each other.

The wheel 12, outer race 18, inner bearing assembly 20 and axle 22 are assembled with a caster or other wheel support 64 in the following manner. The support 64 typically includes downwardly extending side plates or flanges 66 that include aligned apertures 68, said apertures 68 being arranged to receive opposite ends of a metal axle member, pin or rod 22 which, in the embodiment of FIG. 2, includes a hollow end 70 that is turned over in the manner of a rivet against a flange 66 when the axle 22 is assembled to the flanges of the caster.

The opposite end of axle 22 includes an enlarged head 72 that engages a flange 66 of support 64 at the end of the axle 22 that is opposite from the hollow end 70. It is to be noted that the use of a support 64 as a wheel support is described for illustrative purposes only. Any other type of wheel support could be used, including, for example, a single plate disposed on one side of the wheel assembly, a pair of plates without a caster bearing, or any other similar or equivalent structure. Likewise, any other type of axle may be utilized without departing from the invention, for example a bolt, pin, rod or the like using a suitable device for preventing axial withdrawal of the axle member from the wheel support structure.

In the preferred embodiment, the outer ends of the inner bearing halves 24,26 will extend slightly beyond the axial ends 34 of the outer bearing race 18. For example, in the embodiment illustrated in FIG. 2, the enlarged portions 58 of the outer ends 48 of inner bearing halves 24,26 will project beyond the axial ends 34 of the outer bearing race 18 while projecting radially along the outer ends 34 of the outer bearing race. The enlarged portions 58 will provide a spacer between the flanges 66 and the outer ends 34 of the outer bearing race 18 and also will provide end bearing sliding surfaces between the ends of the outer bearing race and the inner sides of the enlarged portions 58.

To assemble the wheel 12 with its associated outer bearing race 18, inner bearing assembly 20 and axle 22 on the support 64, the inner bearing halves 24,26 are inserted into the bore of the outer bearing race 18 (that has already been fixed inside bore 16 of wheel 12) so that the outer bearing surfaces 46 of the bearing halves 24,26 and the inner bearing surface defined by bore 30 are placed into engagement with each other in relatively sliding relationship. The inner ends 50 of the inner bearing halves 24,26 are abutted against each other with the interlocking structure 52 engaged. The enlarged portions 58 of the bearing halves 24,26 rest against the outer ends 34 of the outer bearing race 18 and the dust shields 60 are placed over the outer ends 48 of the bearing halves 24,26.

The axle pin 22 is inserted through the openings 68 in the flanges 66 and through the bore 28 of the inner bearing halves 24,26. The hollow end 70 is expanded and crimped against a flange 66 with the enlarged head 72 of the axle 22 securely engaging the opposite flange 66. The crimping action of the hollow end 70 of axle 22 draws the flanges 66 together axially along the axle 22 so as to compress somewhat the flanges 66 against the outer ends of the bearing halves 24,26. The bearing halves 24,26 are configured such that, with their inner ends abutted against each other, free relative rotation between the outer bearing race 18 and the inner bearing assembly 20 is not impaired. That is, crimping of the end 70 of the axle 22 will not compress the bearing halves 24,26 to the extent that they will become frictionally locked against the ends 34 of the outer bearing race 18. Preferably, a slight clearance will be left so that the wheel 12 and outer bearing race 18 can rotate freely on the inner bearing assembly 20.

Relatively rotation between the wheel 12 and the inner bearing assembly 20 occurs between the outer bearing race 18 and the inner bearing assembly 20 along their respective bearing surfaces. That is to say, the outer bearing surfaces 46 of the inner bearing halves 24,26 and the inner bore 30 of the outer bearing race 18.

The flanges 66, rivet 22, dust shield 60 and the inner bearing assembly 20 remain fixed against rotation relative to the wheel 12 and the outer bearing race 18.

The resin material of the outer race 18 preferably is softer than the synthetic resin forming the inner race assembly 20 in accordance with a preferred embodiment of the invention. The synthetic resins of the outer race and inner race assembly are selected such that the bearing surfaces can freely slide relative to each other without lubrication. In a preferred embodiment, the outer bearing race 18 may be formed of DELRIN 500™ (E. I. DuPont) and the inner bearing halves 24,26 may be formed of NYLON 66. It will be apparent to those skilled in the art that the resin materials may be selected so that they are durable and provide shock resistant characteristics to the bearing assembly.

FIGS. 10–14 illustrate alternate preferred embodiments of the inner bearing assembly 20. As illustrated in FIG. 10, the inner bearing assembly may be constructed of identical bearing halves 80 wherein the mating interlocking structure 82, located at the inner end 84 of the bearing half 80, includes axially elongated, notched locking pins 86 that are configured to engage matching sockets 88 in a mating inner bearing half. When the inner ends of the bearing halves are abutted against each other, the locking fingers 86 snap into cooperating matching sockets 88 to thereby secure the inner bearing halves together against relative axial displacement as well as against relative rotation and relative radial displacement.

In accordance with this embodiment, the inner bearing half 80 also includes an integral dust cover 90 formed as part of the outer end 92 of the inner bearing half 80. A radially enlarged outer end portion 94 is provided on the inner bearing half 80, but this enlargement is optional and may be omitted for some applications.

In accordance with this embodiment, an outer peripheral surface 96 provides an outer cylindrical sliding bearing surface and the bore 98 is intended to receive an axle, for example, an axle corresponding to axle 22 in the embodiment shown in FIG. 2.

FIG. 11 shows still another embodiment of the inner bearing half 100 according to the invention having an outer end 102 without any radial enlargement. The interlocking feature at the inner end 104 comprises axially extending pins and sockets 106, 108. The pins 106 preferably have "crush ribs" 106a extending axially along their lengths or a portion of their lengths that provide an interference fit in smooth sockets 108 when bearing halves 100 are abutted against each other at their ends with the pins and sockets, to thereby hold the bearing halves against relative radial, rotational and axial motion. When the pins 106 are inserted in sockets 108, the ribs are crushed down by compression to provide a tight interference or friction fit. Otherwise, the inner bearing half 100 includes an outer cylindrical bearing surface and an inner bore similar to the other preferred embodiments of the inner bearing race assembly.

In accordance with FIG. 12, still another preferred embodiment of an inner bearing assembly 110 is illustrated, wherein inner bearing halves 112,114 have inner ends 116, 118 that are provided with an interlocking feature in the form of mating, cooperating threads 120,122 that fit together in male and female relationship when the inner ends 116,118 are disposed so as to abut each other. The mating threads 120,122 maintain the inner ends of the inner bearing halves secured together while preventing relative axial displacement and radial displacement between the inner bearing halves.

In accordance with FIG. 13, another embodiment of an inner bearing assembly is illustrated wherein inner bearing halves 124,126 include inner ends 128,130 provided with an interlocking feature in the form of an annular toothed ring 132 and a cooperating, mating socket 134. The toothed ring 132 will fit snugly in the socket 134 when the inner ends 128,130 abut against each other when the bearing halves 124,126 are assembled within an outer bearing race. The toothed wheel 132 and the socket 134 prevent relative rotation between the bearing halves while preventing relative radial displacement between the ends 128,130 of the bearing halves.

Still another preferred embodiment of an inner bearing assembly is illustrated in FIG. 14, wherein inner bearing halves 136,138 are not provided with a specific interlocking feature at their inner ends but the inner ends simply abut against each other when the halves are finally assembled as an inner bearing assembly. The outer ends 140,142 of the bearing halves 136,138 are illustrated with radial enlargements, although the radial enlargements may be omitted for some applications. The bearing halves 136,138 include cylindrical outer bearing surfaces and an inner bore consistent with the other embodiments of the inner bearing assembly described above.

The inner bearing halves in all embodiments are formed of synthetic resin that is preferably injection molded, although the bearing halves may be formed in any manner that is economically suitable in accordance with manufacturing procedures known to those skilled in the art.

The illustrated embodiments of the invention are intended to be illustrative only, recognizing that persons having ordinary skill in the art may construct different forms of the invention that differ from the illustrated embodiments while they fully fall within the scope of the subject matter appearing in the following claims which define the inventive subject matter.

What is claimed is:

1. A wheel and bearing assembly comprising:
    a wheel including a central hub having an axially extending axle receiving bore and formed of moldable material;
    an outer bearing race having opposed axial ends and formed of moldable synthetic resin having a cylindrical inner bearing sliding surface disposed in said bore over its length, said outer bearing race having an outer peripheral surface and means on the outer peripheral surface for securing the outer bearing race in the adjacent wheel hub material such that the outer bearing race is locked against motion relative to the wheel;
    an inner bearing assembly formed of moldable synthetic resin and comprising two inner bearing halves, each half having a central axial bore extending between inner and outer ends of the respective bearing half and an outer cylindrical bearing sliding surface;
    said inner bearing assembly disposed in said outer bearing race with the inner and outer bearing sliding surfaces thereof in sliding contact with each other, and with the inner ends of the inner bearing halves abutted against each other so as to provide a continuous outer cylindrical bearing sliding surface, with the outer ends of the inner bearing halves located adjacent the axial ends of the outer bearing race.

2. An assembly as claimed in claim 1, wherein said inner bearing halves each includes an interlocking structure at its respective inner end, and wherein the interlocking structures of the bearing halves are configured to structurally cooperate with each other when the inner ends of the inner bearing halves are abutted against each other to prevent at least relative radial displacement between the inner ends of the bearing halves.

3. An assembly as claimed in claim 2, wherein the interlocking structures are configured to prevent relative rotation between the bearing halves when the ends of the inner bearing halves are abutted against each other.

4. An assembly as claimed in claim 2, wherein the interlocking structures are configured to prevent relative axial displacement between the bearing halves when the ends of the inner bearing halves are abutted against each other.

5. An assembly as claimed in claim 2, wherein the interlocking structures include axially extending, circumferentially spaced alternating fingers and sockets that are interdigited when the inner ends of the inner bearing halves are abutted against each other.

6. An assembly as claimed in claim 2, wherein the interlocking structure includes mating screw threads.

7. An assembly as claimed in claim 2, wherein the interlocking structure includes mating teeth and recesses.

8. An assembly as claimed in claim 1, wherein said outer ends of said inner bearing halves are located beyond the axial ends of the outer bearing race and are enlarged to a greater radial dimension than the outer cylindrical bearing surfaces of the inner bearing halves.

9. An assembly as claimed in claim 8, including annular dust shields having central apertures, said dust shields mounted on the enlarged outer ends of the inner bearing halves with the central apertures fitting snugly on the enlarged ends.

10. An assembly as claimed in claim 1, including annular dust shields disposed at the outer ends of the inner bearing halves.

11. An assembly as claimed in claim 10, wherein said annular dust shields are integral with said inner bearing halves.

12. An assembly as claimed in claim 1, wherein the synthetic resin forming the outer race is softer than the synthetic resin forming the inner race.

13. An assembly as claimed in claim 1, including a wheel support, said support including at least one side flange extending over at least one outer end of the inner bearing halves;
    an axle member extending through the inner bearing halves in close fitting relationship and through said at least one side flange;
    an axle retainer arrangement including an axle locking device for retaining the axle against axial motion in the inner bearing assembly and the flange; and
    an axle and inner bearing assembly anti-rotation feature arranged to prevent relative rotation between the side flange, the axle member and the inner bearing assembly.

14. An assembly as claimed in claim 9, including a wheel support, said support including at least one side flange extending over at least one enlarged outer end of the inner bearing halves;
    an axle member extending through the inner bearing halves in close fitting relationship and through said side flange;
    an axle retainer arrangement including an axle locking device for retaining the axle against axial motion in the inner bearing assembly; and
    an axle and inner bearing assembly anti-rotation feature arranged to prevent relative rotation between the side flange, the axle member and the inner bearing assembly.

15. An assembly as claimed in claim 1, wherein said means on the outer peripheral surface for securing the outer bearing race in the adjacent wheel hub material comprises axially extending, circumferentially spaced protrusions on the outer peripheral surface.

16. An assembly as claimed in claim 15, said protrusions on the periphery of the outer bearing race having tapered end portions that slope inwardly towards the bore of the outer race such that the radial thickness of the protrusions decrease as the ends of the protrusions approach the ends of the outer bearing race.

17. An assembly as claimed in claim 16, including a centrally located channel extending around the periphery of the outer bearing race; said protrusions including inner ends terminating at said channel; and wherein the intersection of the protrusions with the channel define sharp edges for engaging wheel hub material.

18. An assembly as claimed in claim 17, wherein the ends of the protrusions at their intersection with the channel are sloped in a radially inward and axial direction.

19. An assembly as claimed in claim 16, said tapered end portions each including at least one ridge of steeper slope than the remainder of the respective tapered end portion.

20. An inner race for a synthetic resin wheel bearing assembly, the inner race comprising:
    two annular inner bearing halves formed of moldable synthetic resin, each half having a central axial bore extending through the bearing half, and an outer cylindrical bearing sliding surface on the outer periphery of the half;
    each bearing half having axially spaced inner and outer ends;
    said inner ends including an interlocking structure;
    the interlocking structure of each bearing half being configured to cooperate and engage with the other inner bearing half when the bearing halves are disposed with their inner ends abutted against each other to prevent at least relative radial displacement between the ends;
    said bearing halves presenting a continuous cylindrical bearing surface when the inner ends of the halves are abutted against each other with their bores aligned.

21. An inner race as claimed in claim 20, wherein said interlocking structure includes axially extending circumferentially spaced alternating fingers and sockets that are interdigited when the bearing halves are disposed with their inner ends abutted against each other.

22. An inner race as claimed in claim 20, wherein said interlocking structure includes mating screw threads.

23. An inner race as claimed in claim 20, wherein said interlocking structure includes mating teeth and recesses.

24. An inner race as claimed in claim 21, wherein said alternating fingers and sockets include snap fit connections that, when mated, secure the bearing halves against relative axial displacement.

25. An outer race for a synthetic resin wheel bearing assembly, said outer race formed of moldable synthetic resin and having a cylindrical inner bearing sliding surface defining an axially extending bore over the length of the outer bearing race, and an outer peripheral surface including axially extending, circumferentially spaced protrusions, said protrusions extending each over a portion of the outer periphery of the outer bearing race and having tapered outer end portions sloping towards the bore of the outer bearing race as the protrusions approach the ends of the outer bearing race; and a central circumferential channel extending over the outer periphery of the outer race; said protrusions at their inner ends intersecting said channel.

26. The outer race as claimed in claim 25, wherein the intersection of the protrusions with said channel define sharp edges.

27. The outer race as claimed in claim 26 wherein each of the tapered outer end portions includes at least one ridge of steeper slope than the remainder of the respective outer end portion.

* * * * *